United States Patent [19]

Komiya

[11] Patent Number: 5,297,873
[45] Date of Patent: Mar. 29, 1994

[54] STOPPER ASSEMBLY FOR USE IN A LINEAR MOTION GUIDE UNIT

[75] Inventor: Yoshiyuki Komiya, Kawasaki, Japan

[73] Assignee: Nippon Thompson Co., Ltd., Tokyo, Japan

[21] Appl. No.: 947,321

[22] Filed: Sep. 18, 1992

[30] Foreign Application Priority Data

Sep. 20, 1991 [JP] Japan ................ 3-268972

[51] Int. Cl.$^5$ .............................. F16C 29/06
[52] U.S. Cl. .............................. 384/45; 384/21; 384/49
[58] Field of Search .............. 384/45, 44, 21, 49, 384/59, 47, 9

[56] References Cited

U.S. PATENT DOCUMENTS

| | | | |
|---|---|---|---|
| 4,773,770 | 9/1988 | Osawa | 384/45 |
| 5,011,300 | 4/1991 | Teramachi | 384/45 |
| 5,085,523 | 2/1992 | Hobbs | 384/21 |
| 5,088,839 | 2/1992 | Tsukada | 384/45 |

Primary Examiner—Lenard A. Footland
Attorney, Agent, or Firm—Skjerven, Morrill, MacPherson, Franklin and Friel

[57] ABSTRACT

A stopper assembly for use in a linear motion rolling contact guide unit, including a rail formed with a pair of inner guide grooves, a slider slidably mounted on the rail and formed with a pair of outer guide grooves, each located opposite to a corresponding one of the inner guide grooves to thereby define a guide channel and a plurality of rolling members provided in the guide channel, generally includes a generally U-shaped main body and a bolt. The main body includes a horizontal section and a pair of vertical sections extending vertically from the respective ends of the horizonal section. One of the vertical sections is provided with a projection which is received in one of the inner guide grooves and the other vertical section is provided with a threaded hole in which a bolt extends and has its tip end received in the other inner guide groove.

3 Claims, 2 Drawing Sheets

STOPPER ASSEMBLY FOR USE IN A LINEAR MOTION GUIDE UNIT

BACKGROUND OF THE INVENTION

1. Field of the Invention

This invention generally relates to a linear motion guide unit, and, in particular, to a stopper assembly for use in a linear motion guide unit, such as a linear motion rolling contact guide unit. More specifically, the present invention relates to a stopper assembly for limiting a relative motion between a slider and a rail in a linear motion guide unit.

2. Description of the Prior Art

A linear motion rolling contact guide unit is well known and it generally includes a rail extending over a desired distance, a slider slidably mounted on the rail and a plurality of rolling members interposed between the rail and the slider to thereby provide a rolling contact between the rail and the slider. Typically, the rail has a pair of opposite side surfaces, each of which is formed with an inner guide groove extending in parallel with the longitudinal axis of the rail. The slider, typically, has a generally U-shaped cross section and thus a horizontal section located above the rail and a pair of vertical sections extending vertically downward from the horizontal section. Each of the vertical section is formed with an outer guide groove located opposite to a corresponding one of the inner guide grooves of the rail so that a guide channel is defined between a pair of oppositely located inner and guide grooves. And, a plurality of rolling members, such as rollers or balls, are provided in the guide channel so as to provide a rolling contact between the rail and the slider.

Such a linear motion guide unit can be either of the infinite stroke type or of the finite stroke type. In the former case, at least an endless circulating path is provided in the slider, and the endless circulating path typically includes a load path section, which corresponds to the above-mentioned guide channel, a return path section and a pair of curved connecting path sections, each connecting the corresponding ends of the load and return path sections. With this structure, theoretically speaking, since the rolling members can roll along the endless circulating path indefinitely, the slider could move along the rail as long as the rail extends. On the other hand, in the case of the finite stroke type, no such endless circulating path is provided and thus the relative motion between the rail and the slider is limited according to their sizes.

In such a linear motion guide unit, since the slider move along the rail, a stopper assembly must be provided to limit the relative motion between the slider and the rail. Otherwise, the slider may slip away from one end of the rail. In addition, when such a linear motion guide unit is shipped, transported or handled for some reason, such as mounting on an object, it is often desired to have such a stopper assembly to prevent the relative motion between the slider and the rail temporarily.

Several stopper assemblies for use in such a linear motion guide unit have been proposed as described in the Japanese Pat. Post-exam Pub. No. 62-8432 and the Japanese Pat. Laid-open Pub. No. 2-300517. However, in the case of a stopper assembly disclosed in the above-mentioned Pub. No. 62-8432, the stopper assembly includes a downwardly extending projection and thus a detent hole must be provided at the top surface of the rail. As a result, an extra step for providing such a detent hole is required and there is no freedom in selecting the location of the rail on which such a stopper assembly is to be mounted.

On the other hand, a stopper assembly described in the other Pub. No. 2-300517 is illustrated here in FIG. 4. As shown in FIG. 4, the stopper assembly generally includes a generally C-shaped main body E provided with a threaded hole B and a bolt A threaded into the hole B. As the bolt B is turned to further extend through the hole B, a central portion of the main body where the hole B is provided is lifted upward and away from the top surface D of a rail C so that moments M1 and M2 are applied to both ends of the main body E. As a result, clamping forces P1 and P2 directed opposite to each other are applied at contact points H1 and H2 between the bottom ends of hook portions F1 and F2 and guide grooves G1 and G2 of the rail C.

When the central portion of main body E where the threaded hole B is provided is lifted upward in this manner, a stress concentration occurs in that portion of main body E since the cross sectional area is rather small. For this reason, in the stopper assembly shown in the Pat. Laid-open Pub. No. 2-300517, there is a need to increase the rigidity of main body E. However, if the rigidity of main body E is increased, the probability of producing scars or damages in the surface of guide grooves F1 and F2 at contact points H1 and H2 increases. Thus, in order to cope with this situation, there arises a need to provide a lining of an elastic material, such as rubber, on the main body E, which then tends to push up the manufacturing cost.

If the rigidity of the main body E is increased, the rigidity of bolt A for lifting the central portion of the main body E also increases. However, if the rigidity of bolt A is increased, there is an increased chance that the top surface D of rail C becomes deformed or damaged as pressed by the bottom end of the bolt A when the bolt A is forcibly turned to further extend through the threaded bold B.

SUMMARY OF THE INVENTION

In accordance with the present invention, there is provided a stopper assembly for use in a linear motion rolling contact guide unit including a rail formed with a pair of inner guide grooves on its opposite surfaces, a slider slidably mounted on said rail and formed with a pair of outer guide grooves, each located opposite to a corresponding one of said pair of inner guide grooves to thereby define a guide channel therebetween and a plurality of rolling members provided in said guide channel, said assembly comprising a main body and a bolt, said main body including a horizontal section extending transversely across said rail and spaced apart therefrom and a pair of vertical sections, each extending along a corresponding one of said pair of side surfaces of said rail as spaced apart therefrom, one of said pair of vertical sections including a projection which may project into one of said pair of inner guide grooves of said rail and the other of said pair of vertical sections being formed with a threaded hole at a predetermined location, said bolt, when threaded into and through said threaded hole, extending into the other of said pair of inner guide grooves of said rail.

Preferably, either one or both of said main body and said bolt is comprised of a synthetic resin. In one embodiment, a stress relief section is provided at each inner corner of said main body at a junction between said horizontal section and each of said vertical sections.

Therefore, it is a primary object of the present invention to provide an improved stopper assembly for use in a linear motion rolling contact guide unit.

Another object of the present invention is to provide such an improved stopper assembly reliable in operation, light in weight and low at cost.

A further object of the present invention is to provide such an improved stopper assembly which does not require any processing to the guide unit, which does not damage the rail and which has a high degree of freedom as to the mounting location on the rail.

Other objects, advantages and novel features of the present invention will become apparent from the following detailed description of the invention when considered in conjunction with the accompanying drawings.

DESCRIPTION OF THE PREFERRED EMBODIMENTS

Figure 1:
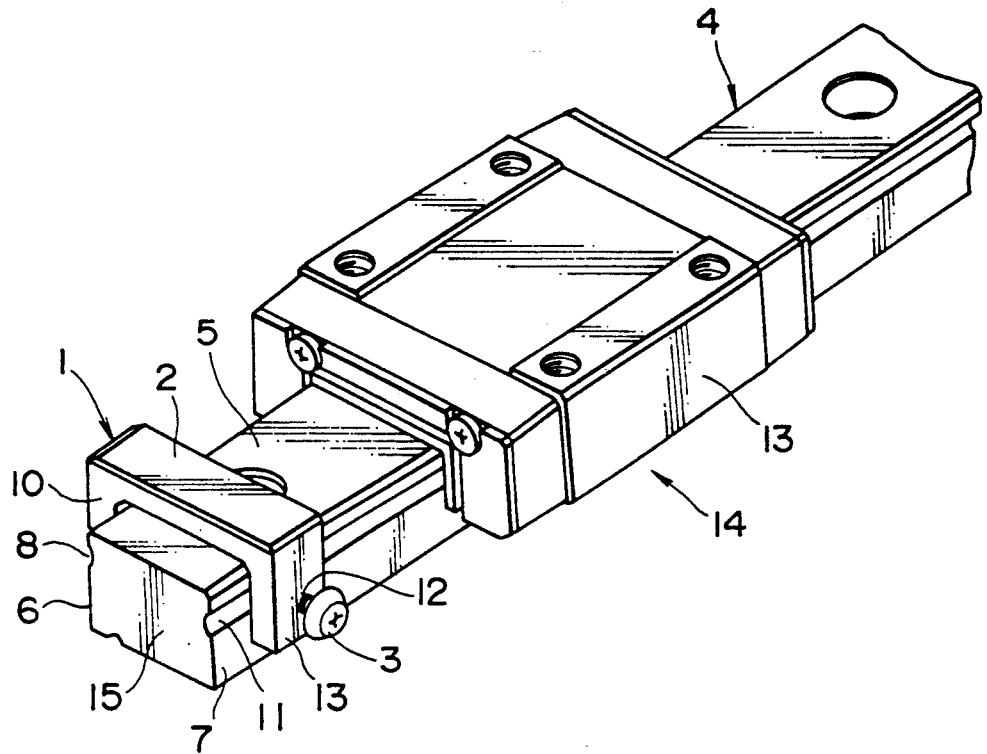
FIG. 1 is a schematic illustration showing in perspective view a stopper assembly according to one embodiment of the present invention when mounted on a linear motion rolling contact guide unit.

As shown in FIG. 1, a stopper assembly 1 constructed in accordance with one embodiment of the present invention is fixedly mounted on a linear motion rolling contact guide unit 14. The linear motion rolling contact guide unit 14 generally includes a rail 4 which extends straight over a desired length, a slider 13 slidably mounted on the rail 4, and a plurality of rolling members, such as rollers or balls, interposed between the rail 4 and the slider 13 to provide a rolling contact between the rail 4 and the slider 13. In the illustrated embodiment, the rail 4 is generally rectangular or square in cross section and thus it has a top flat surface 5 and a pair of vertical side surfaces 6 and 7, each of which is formed with an inner guide groove 8, 11 extending in parallel with the longitudinal axis of the rail 4.

The slider 13 has a generally U-shaped cross section, including a horizontal section and a pair of vertical side sections depending from a corresponding side of the horizontal section. And, an outer guide groove (not shown) is formed in each of the vertical side sections of the slider in an opposed relationship with a corresponding one of the pair of inner guide grooves to thereby define a guide channel therebetween. The plurality of rolling members are provided in these guide channels as partly received in each of the pair of opposed inner and outer guide grooves so that a rolling contact is provided between the rail 4 and the slider 13. In one embodiment, the slider 13 is provided with a pair of endless circulating paths, each including a load path section, which corresponds to the above-mentioned guide channel, a return path section and a pair of curved connecting path sections, each connecting the corresponding ends of the load and return path sections. In another embodiment, the slider 13 is provided with only the outer guide grooves, each located opposite to a corresponding one of the inner guide grooves. The former case is the so-called infinite stroke type and the latter case is the so-called finite stroke type. The present invention is applicable to either of these types.

As shown in FIG. 1, the present stopper member for limiting the movement of the slider 13 relative to or along the rail 4 is fixedly mounted on the rail 4 at a location near its left end 15. Thus, when the slider 13 slidably moves along the rail 4 toward left, the slider 13 comes into contact with the present stopper assembly 1 to stop its motion along the rail 4 toward left. As shown, the present stopper assembly 1 generally includes a main body 2 and a bolt 3. Preferably, at least one of the main body 2 and the bolt 3 is comprised of a synthetic resin. The main body 2 is generally U-shaped and thus it includes a horizontal section and a pair of vertical sections 10 and 13, each extending substantially vertically from a corresponding end of the horizontal section.

The left-hand vertical section 10 is formed with a projection 9 which extends horizontally from an inner side surface thereof. In the illustrated embodiment, the projection 9 has a generally trapezoidal shape. However, the shape of projection 9 should not be limited to such a specific shape and it may have any other desired shape. The projection 9 must be so provided that it may project into a corresponding one of the pair of guide grooves 8 and 11 of the rail 4. Preferably, the projection 9 has a shape which is generally convergent toward its tip end.

On the other hand, the right-hand vertical section 13 is formed with a threaded hole 12 as extending therethrough at a location substantially in an alignment with the projection 9 at the left-hand vertical section 10. The bolt 3 is threaded into the hole 12 and its tip end 16, which is somewhat rounded, may enter into a corresponding one of the pair of inner guide grooves 8 and 11 of the rail 4.

Figure 2:
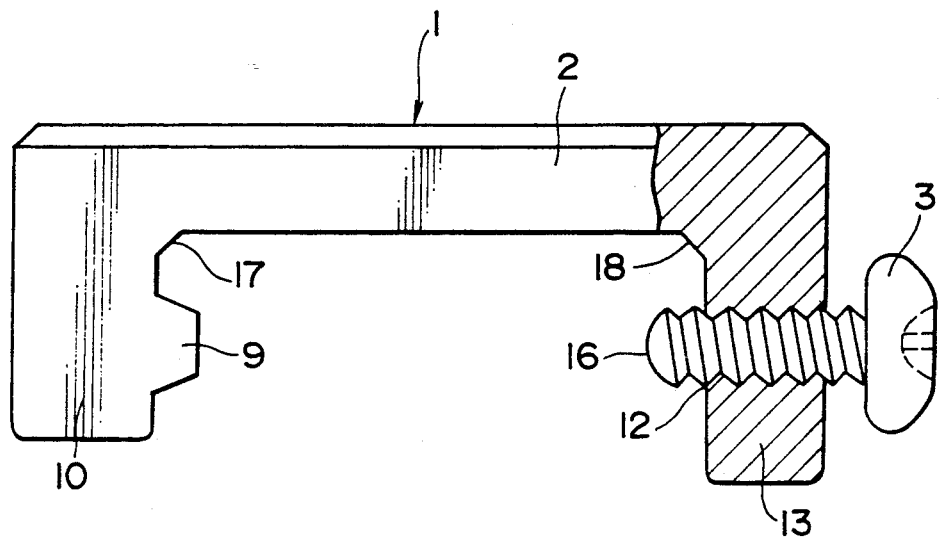
FIG. 2 is a schematic illustration showing in front view and partly in cross section the stopper assembly shown in FIG. 1.

In addition, as shown in FIG. 2, a stress relief section 17, 18 is provided at each inner corner of the U-shaped main body 2 at a junction between the horizontal section and each of the vertical sections 10 and 13. These stress relief sections 17 and 18 are provided so as to avoid the creation of stress concentration as much as possible at these corners since it is highly likely that a stress concentration could occur at these corners when the bolt 3 is strongly tightened. In the illustrated embodiment, a slant corner is provided as each of these stress relief sections 17 and 18, any other shape may be adopted for this purpose. For example, a rounded or arcuate shaped corner may also be provided, if desired.

Figure 3:
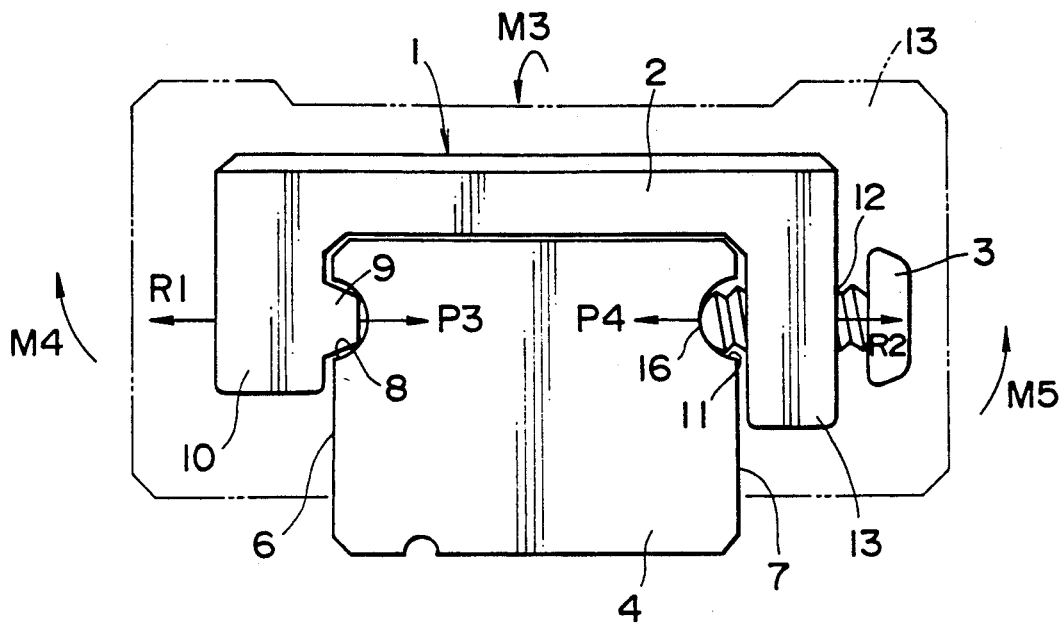
FIG. 3 is a schematic illustration showing in front view the stopper assembly mounted on the guide unit shown in FIG. 1.

As shown in FIG. 3, when the present stopper assembly 1 is fixedly mounted on the rail 4 by tightening the bolt 3, the side projection 9 is received in the inner guide groove 8 and the tip end 16 of the bolt 3 is received in the other inner guide groove 11. In this instance, as the bolt 3 is tightened, the projection 9 applies a pressing force P3 to the rail 4 at a contact between the projection 9 and the inner guide groove 8 and the tip end 16 of the bolt 3 applies a pressing force P4 to the rail 4 at a contact between the tip end 16 and the inner guide groove 11, as indicated in FIG. 3. As a result, the main body 2 becomes clamped to the rail 4.

When the slider 13 comes into contact with the stopper assembly 1, it receives an external force M3 applied by the clamped to the rail 4, the stopper assembly 1 is not caused to move but stays still to thereby cause the slider 13 to stop its motion along the rail 4. Therefore, the present stopper assembly 1 is quite effective in providing a stopping function against the slider 13.

Figure 4:
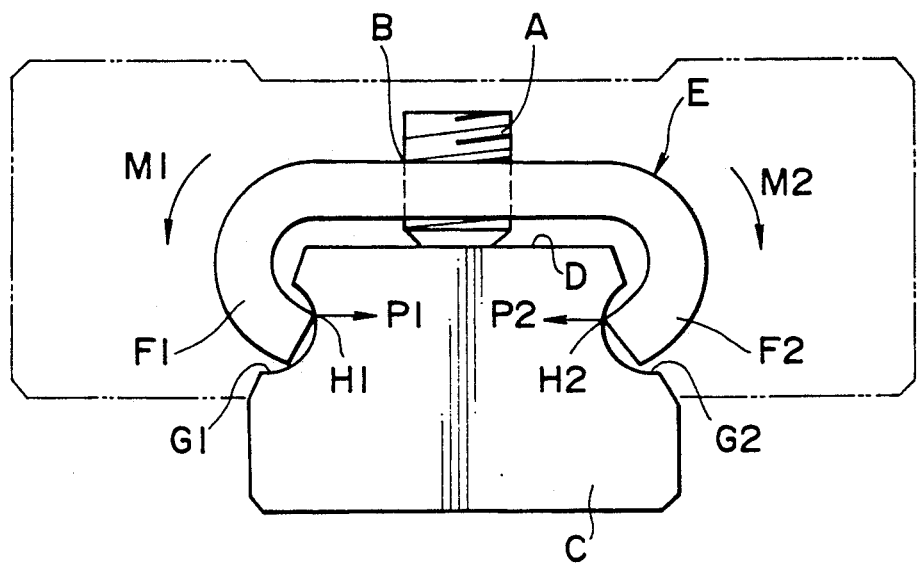
FIG. 4 is a schematic illustration showing a typical prior art stopper assembly when mounted on a linear motion rolling contact guide unit.

As also shown in FIG. 3, when the bolt 3 is tightened to apply the clamping forces P3 and P4 opposite in direction, reaction forces R1 and R2 are applied to the left and right vertical sections 10 and 13 so that moments M4 and M5 are applied to the left and right vertical sections 10 and 13. However, in the present embodiment, since the vertical section 13 through which the bolt 3 extends has a free bottom end, such a moment would not adversely affect the bolt 3 or to the vertical section 13. Thus, it is not necessary to provide an increased rigidity to the main body 1 and/or to the bolt 3, as different from the prior art structure shown in FIG. 4. Accordingly, either one or both of the main body 2 and the bolt 3 may be comprised of a synthetic resin material in the present embodiment.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A stopper assembly for use in a linear motion rolling contact guide unit including a rail formed with a pair of inner guide grooves on its opposite surfaces, a slider slidably mounted on said rail and formed with a pair of outer guide grooves, each located opposite to a corresponding one of said pair of inner guide grooves to thereby define a guide channel therebetween and a plurality of rolling members provided in said guide channel, said assembly comprising:

a main body; and a bolt, said main body including a horizontal section extending transversely across said rail and spaced apart therefrom and a pair of vertical sections, each extending along a corresponding one of said pair of side surfaces of said rail as spaced apart therefrom, one of said pair of vertical sections including a projection which may project into one of said pair of inner guide grooves of said rail and the other of said pair of vertical sections being formed with a threaded hole at a predetermined location, and said bolt, when threaded into and through said threaded hole, extending into the other of said pair of inner guide grooves of said rail.

2. The assembly of claim 1, wherein either one or both of said main body and said bolt is comprised of a synthetic resin.

3. The assembly of claim 2, wherein a stress relief section is provided at each inner corner of said main body at a junction between said horizontal section and each of said vertical sections.

* * * * *